United States Patent

Lowman, Jr.

[15] 3,648,676
[45] Mar. 14, 1972

[54] PROCESS FOR REDUCING DETONATION

[72] Inventor: Malden C. Lowman, Jr., San Rafael, Calif.

[73] Assignee: Environmental Quality Engineering, Inc., Oakland, Calif.

[22] Filed: Mar. 17, 1971

[21] Appl. No.: 125,197

[52] U.S. Cl.................123/191 R, 123/141, 123/191 A, 123/191 B, 123/198 A
[51] Int. Cl..................F02b 23/00, F02n 29/00, F02b 77/00
[58] Field of Search............123/191 R, 191 A, 191 S, 198 A, 123/191 B, 141

[56] References Cited

UNITED STATES PATENTS 1,703,202   2/1929   Moore ...............................123/191 A

FOREIGN PATENTS OR APPLICATIONS 580,700   9/1946   Great Britain..........................123/141

Primary Examiner—Wendell E. Burns
Attorney—Milmore & Cypher

[57] ABSTRACT

The tendency toward detonation in a spark-ignition internal combustion engine is reduced by adsorbing on an extended surface, such as a wire mesh, the free radicals resulting from oxidation of fuel which otherwise would propagate a chain reaction, the surface being within the combustion chamber, e.g., stationary at the juncture of the cylinder block and head, in spaced relation to the fixed wall of the chamber and positioned between the piston and the ignition device, and having a flame-propagation opening of minor area extending therethrough. The surface may be of material which is catalytic to the oxidation of hydrocarbons and/or $N_2$ to reduce the concentration of CO and/or $NO_x$ in the exhaust gas.

14 Claims, 6 Drawing Figures

Patented March 14, 1972  3,648,676

INVENTOR:
MALDEN C. LOWMAN,
BY: Milmore & Cypher
HIS ATTORNEYS

INVENTOR:
MALDEN C. LOWMAN, JR
BY: Milmore & Cypher
HIS ATTORNEYS

PROCESS FOR REDUCING DETONATION

The invention relates to internal combustion engines operated on fuel such as gasoline and fired by an electrical ignition device such as a spark plug, which are constructed to reduce the tendency to detonate; to extended surface devices suitable for installation in engines for this purpose; and to a process for reducing detonation. Thereby it becomes possible to use fuel which is free from knock-suppressing compounds, such as tetraethyl lead and tetramethyl lead, with a resultant elimination from the exhaust of the heavy metal residues which result from combustion of the anti-knock compounds and reducing the atmospheric pollution while retaining the advantages of a high compression ratio. In an optional form, made possible by practicing the foregoing, pollution of the atmosphere due to the presence in the exhaust of harmful oxidation products of carbon and nitrogen, such as CO and $NO_x$, is reduced by promoting a closer approach to equilibrium species ($CO_2$ and $N_2$) within the engine as the exhaust gas cools during expansion.

Engine knock is caused by a free radical chain reaction, in which some of the hydrocarbon fuel near the ignition device forms free radicals which increase exponentially in concentration as the combustion progresses. This process continues at an increasing rate until the front of the part of the charge which is rich in these free radicals reaches detonation velocity.

Among various theories of the action of detonation inhibitors is that of Walsh and coworkers, that the lead antiknock compounds form solid particles upon which these active free radicals, such as OH, H, and $HO_2$, are destroyed. (Chamberlain, G. H. N., Walsh, A. D., Proc. Roy. Soc. (London) A215, 175 (1952), Downs, D., Walsh, A. D., Wheeler, R. W., Trans. Roy. Soc. (London) 243, 463 (1951).)

Certain oxidized compounds of carbon and nitrogen, specifically CO and $NO_x$, are thermodynamically stable only at the high temperatures prevailing during the combustion within the engine while the charge is compressed, and their less harmful forms, specifically $CO_2$ and $N_2$ are present in the exhaust at lower than equilibrium concentrations because of the extremely rapid cooling of the combustion products by the expansion, which produces a quenching effect. The more stable forms of these elements would be created if the expansion occurred more slowly, or if some means were provided to enhance reaction rates leading toward the attainment of equilibrium.

Now according to the invention, the free readical chain reaction is suppressed or retarded by adsorption of a portion of the free radicals, which result from the combustion and which would otherwise cause an uncontrolled acceleration of the chain reaction, on a surface which is formed on a body mounted within the combustion chamber in spaced relation to the movable wall, such as the piston head, and to the opposite, stationary wall, such as the cylinder head, the body having said movable wall on one side thereof and the ignition device on the other and being positioned so that the flame front containing free radicals must intimately contact its surface, the body having extending therethrough over a minor part of its area at least one passage for the propagation of the flame. In a specific embodiment, the body may be one or more layers of wire mesh, positioned across the engine cylinder bore at about the juncture of the cylinder head and the cylinder block, and the flame propagation passage is a hole situated generally near the ignition device. This hole may be empty or may contain wire or mesh of a density less than over the major part of the body's area, so as to permit a flame to pass through it.

It will be understood that in engines wherein the top of the piston or a part thereof rises to beyond the top of the cylinder block, the body must be positioned so as not to be engaged by the piston, e.g., mounted beyond the top of the block and/or bowed upwardly.

To insure good contact of the free radicals with the surface of the body, the latter provides a surface-to-bulk-volume ratio of at least 25 sq. cm. per cu. cm. The surface area of the body required to provide the rate of adsorption of free radicals necessary to suppress the detonation is variable and depends upon the compression ratio of the engine, the fuel octane rating, and the combustion chamber configuration. The area requirement will vary directly with the compression ratio and inversely with the octane number. The minimum surface requirement for the lowest practical compression ratio with the highest non-leaded fuel octane number is approximately twice the cross sectional area of the combustion chamber, measured on a plane perpendicular to the direction of movement of the movable wall, i.e., the area of the cylinder bore in the usual case; the upper limit of the required area for maximum compression ratios with low-octane fuels can be up to 1,000 times the minimum requirement. Practical ranges in both compression ratio and fuel octane rating in most instances require surface areas from 10 to 100 times the said cross sectional area, and this is the most common and the preferred range.

The extended surface body may consist of one or more layers of woven, knitted or tangled wires or ribbons (herein generically called wires) having parts made of metal extending throughout the length and/or breadth thereof, or formed completely of metal, or metallic or nonmetallic particles, such as discrete or fused granules, retained between structurally cohesive sheets of metallic wire mesh or the like, the body providing over a major part of the said cross sectional area of the combustion chamber interstices which are small and insure intimate contact of the free radicals with the extended surface, to reduce the propagation of a detonation. Excessively thick bodies, which lead to the deposition of carbon which can, in turn, glow, should be avoided. For the purpose of preventing rapid deterioration of the body, it is desirable to mount it in heat-exchange relation to the externally cooled wall of the combustion chamber, whereby the cooling effect of conduction of heat from the body to the walls is added to that of the cool, fresh charge.

The property of removing free radicals, which occurs by adsorption of the radicals on the surface, is not dependent upon the composition of the surface, and the body may be made of any material. However, for structural reasons, at least the confining meshes consist of or contain as base material a metal of suitable strength, durability and cost, such as iron, copper and stainless steel or alloys containing them. When only the base consists of such a metal, it is coated with a metal of poorer structural properties, durability or higher cost, e.g., by electroplating, or with a metal oxide or a non-metal. (Coating is of especial advantage in the optional construction described below.) The free radicals adsorbed on any of these surfaces are destroyed by subsequent chain terminating reactions, being burned during the combustion. It is evident that the body should not, however, promote pre-ignition, which is comparable to advancing the spark timing. Thus, materials which have low thermal conductivities, such as nonmetals should be avoided as the sole material of construction or as the base material.

As was previously indicated, the body should not wholly isolate the fired region of the combustion chamber from the region on the other side of the body, which would often stop the propagation of the flame. The flame propagation passage which is provided to prevent this consists of one or more openings through the body which permit the propagation of the flame, preferably situated near to or opposite to the ignition device or devices, and extending over a minor portion of the area of the body, usually less than one-fourth of such area. As was noted above, the opening(s) may be free of material or may contain material with such large interstices that the flame is readily propagated. It will be understood that when the body includes sheet metal portions, they are to be considered as a part of the body. Expressed in terms of the combustion chamber size, the aggregate cross sectional area of the flame propagation passage is preferably between 0.01 and 0.15 of the cross sectional area of the combustion chamber measured on a plane perpendicular to the direction of movement of the movable wall.

In the optional construction, the extended-surface body has at least the surface thereof formed of material which is a catalyst for the oxidation of hydrocarbons; such materials are usually also catalysts for the oxidation of nitrogen. This promotes the rapid conversion of the more harmful oxidized compounds of carbon and nitrogen into their less harmful equilibrium forms during the expansion stroke of the piston, whereby pollution of the atmosphere by the engine exhaust is reduced. For example, the wires may consists of or may be coated with nickel, copper, cobalt, tungsten, silver or iron or an alloy of two or more of them; in the case of coated wires, the base metal preferably has good structural properties, e.g., is a chrome-molybdenum steel, e.g., stainless steel, and the coating may be applied by electro-plating. The oxides of these metals, as well as those of silicon, aluminum and zirconium, are catalytic for the desired reaction, and the wires may be coated with them, or the oxides, especially of the metals, can be formed during use or by a special oxidizing step.

An internal combustion engine of standard construction can be readily modified to attain the objects of the invention by mounting the extended surface body therein. This body can, in one embodiment, be fixed to the opening in the gasket which is placed between the cylinder block and the cylinder head, e.g., by brazing, welding or soldering to the metallic sheath of the gasket, or, according to another embodiment, clamped separately between the block and head.

The invention will be further described with reference to the accompaying drawings, which show several preferred exemplary embodiments, wherein.

Figure 1:
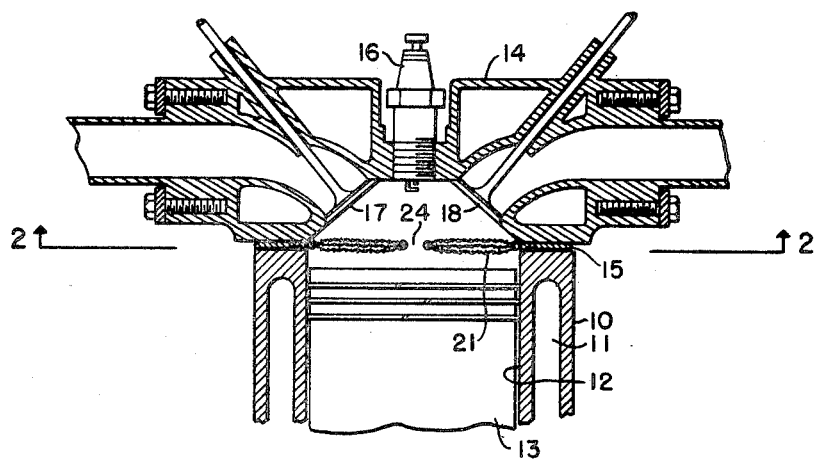
FIG. 1 is a fragmentary sectional view of an engine, taken on the center line of a cylinder bore, certain parts appearing in elevation.
Figure 2:
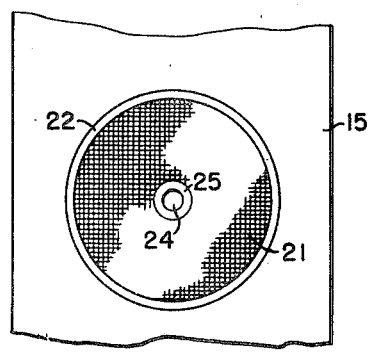
FIG. 2 is a sectional view taken on the line 2—2 of FIG. 1.

Referring to FIGS. 1–3, 10 denotes a cylinder block which is externally cooled, e.g., by passages 11 for cooling water (the invention being equally applicable to air-cooled engines), and having a cylinder bore 12 which contains a reciprocable piston 13, shown at top dead center. A stationary cylinder head 14 is bolted to the block, spaced therefrom by a gasket 15 and carrying an electrically operated ignition device, such as a spark plug 16, an inlet valve means 17 and an exhaust valve 18. It is evident that additional valves may provided; e.g., a separate air intake and fuel valve may be in engines using direct fuel injection.

Figure 3:
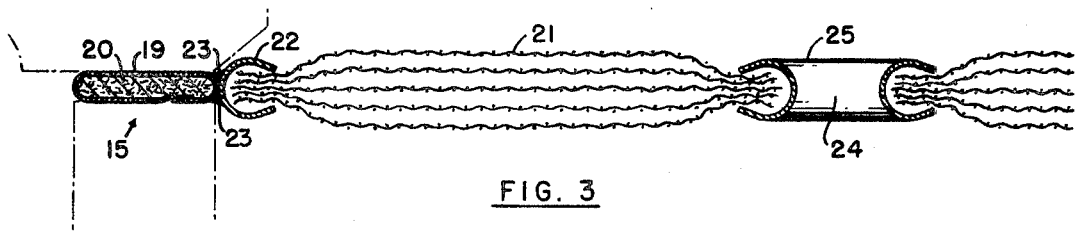
FIG. 3 is an enlarged detail sectional view of parts of the extended surface body and gasket, engine parts appearing in phantom.

The gasket 15, which may be formed of a sheath 19 providing upper and lower metallic layers and an intervening layer of asbestos 20, has a circular opening at and of size equal to that of the bore 12, and carries within this opening the extended surface body, here embodied as a plurality of (five being shown) layers of woven wire mesh 21, the body leaving small insterstices for the passage of the combustible mixture and having a surface-to-bulk-volume ratio at least 25 sq. cm. per cu. cm. These layers, shown spread apart for clarity in FIG. 3, are actually in touching relation to occupy but little vertical space. The layers are united at their peripheries by a crimped ring 22 of sheet metal which is permanently fixed to the sheath 19 by weldments 23. The lowermost layer of the meshes is situated to lie just above the top of the piston when at top dead center, and the uppermost layer is situated to permit maximum travel of the valves 16 and 17 without touching the mesh. Opposite the spark plug 16 is a flame propagation passage in the form of a hole 24 within a crimped, annular, sheet metal ferrule 25 which holds together the inner edges of the mesh layers. The area of the passage is preferably from 0.01 to 0.15 of the area of the bore 12.

In operation, assuming a 4-stroke cycle operation, the fresh charge through the inlet valve 17 is compressed during the upward stroke of the piston until most of it occupies the space within and above the body 21. The spark plug 16 is fired before the piston reaches top dead center, usually at a crank angle at which the piston has travelled about two-thirds of its upward travel, igniting the charge and starting the propagation of the flame downwards and laterally from the spark plug. As a significant portion of the free radicals which are formed during the burning contact the wires of the meshes, they are adsorbed on the extended surfaces of these wires to an extent which suppresses the chain reaction of free radical formation. At the same time, a portion of the flame passes through the passage 24 to ignite the part of the charge beneath the body 21, which part would otherwise not be ignited or ignited sufficiently when the body 21 acts as a flame arrester.

It is evident that any standard engine can be conformed to the engine of the invention, wherein detonation can be suppressed by adsorbing the free radicals, by substituting for the regular gasket the gasket 15 described, which has the extended surface body 21 fixed thereto.

Figure 4:
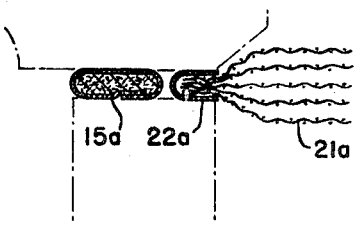
FIG. 4 is a view of a portion of the parts of FIG. 3, showing an alternative construction.

FIG. 4 shows a modified construction in which the extended surface body 21a is separate from the gasket 15a, the latter having an opening somewhat larger than that of the bore of the cylinder block. The mesh layers of the body are held together by a crimped metallic rim 22a which extends into the space between the cylinder block and cylinder head, wholly inside of the opening in the gasket 15a. When the head is bolted down against the block both the gasket and the rim 22a are compressed, whereby the latter is held in position.

Figure 5:
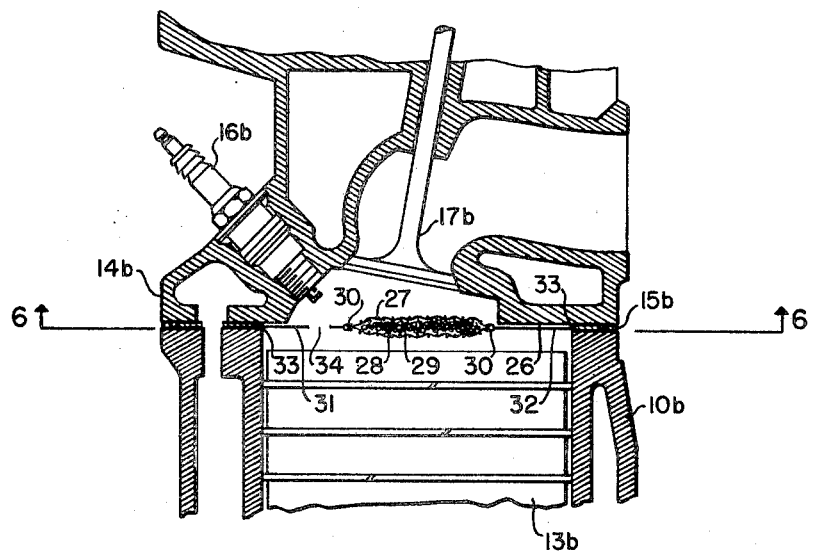
FIG. 5 is a view similar to FIG. 1 showing a third embodiment.
Figure 6:
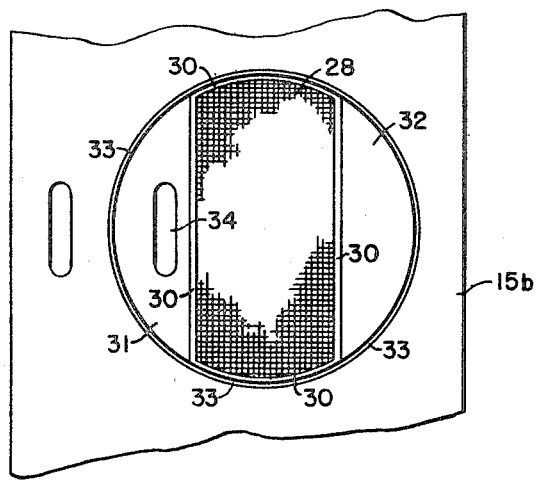
FIG. 6 is a sectional view taken on the line 6—6 of FIG. 5.

FIGS. 5 and 6 show the application of the invention to an engine in which a part of the area above the cylinder bore is covered, as by a solid part on the cylinder head, sometimes known as a "squish area" in the art. The cylinder block 10b and its piston 13b are as previously described. The cylinder head 14b is formed with a wall 26 the lower surface of which conforms in shape to the piston head and is situated so that the piston almost touches it when at its top dead center. In this view only one of the valves 17b appears, the other valve being situated behind the one shown. The spark plug 16b is, in this embodiment, at one side.

A further modification shown in FIGS. 5 and 6 is the extended surface body, which is shown as being composite, including upper and lower cohesive metallic wire meshes 27 and 28 which form, between them, an enclosure containing loose or packed, extended surface material 29, such as small metallic or catalytic bodies. The said enclosure extends over only a part of the combustion chamber which is not covered by the wall 26 in the illustrated embodiment, although this is not a limitation of the invention. A crimped metallic border piece 30 holds the meshes 27 and 28 together at their peripheries, and this piece is fixed by brazing or welding to thin metallic sheets 31 and 32, the former extending to the combustion chamber wall on the side of the spark plug 16b and the latter under the wall 26. The margins of the sheets 31 and 32, as well as the parts of the piece 30 which adjoin the gasket 15b (which is constructed as was described in connection with FIGS. 1–3) are fixed to the metallic gasket sheath by a weldment 33. The sheet 31 has, in the region near to and beneath the spark plug 16b, a flame propagation passage 34, of area as previously described for the passage 24. It is evident that the sheets 31 and/or 32 may but need not be formed of wire mesh or have openings to permit the passage of combustion gas. The sheet 32 should, however, always be thin enough so as not to be touched by the piston 13b.

Although the extended surface material is, in the last embodiment, situated over only a portion of the combustion chamber cross sectional area, the numerical limitations for the surface area provided by the body and the maximum aggregate area of the flame propagation passage have application in terms of the entire cross sectional area of the cylinder bore.

I claim as my invention:

1. An internal combustion engine having stationary and movable walls bounding a combustion chamber, exhaust valve means, and, on a stationary wall, an electrically operated ignition device and inlet valve means for fuel and air, the improvement of
   a. a body at least partly formed of metal and providing an extended surface of at least 25 sq. cm. per cu. cm. of bulk volume mounted within the chamber so as to extend across the chamber with the movable wall on one side thereof and the ignition device and inlet valve means on the other and in spaced relation to said stationary wall, for the adsorption of free radicals from said fuel which otherwise would propagate a chain reaction,
   b. said body having at least one passage extending therethrough for the propagation of a flame from the ignition device and having over the major part of the area of the combustion chamber, measured on a plane perpendicular to the direction of movement of the movable wall, small passages to effect intimate contact of the free radicals with the said extended surface for preventing detonation.

2. An internal combustion engine according to claim 1 which includes a cylinder block containing a reciprocable piston constituting said movable wall, a cylinder head, and a gasket clamped between the block and head, wherein said body is secured to the combustion chamber wall at the junction of the block and head.

3. An internal combustion engine according to claim 2 wherein said body is clamped at its periphery between the block and head, and is separate from the gasket.

4. An internal combustion engine according to claim 2 wherein said body is permanently fixed to said gasket at the periphery of the body.

5. An internal combustion engine according to claim 2 wherein at least one of said block and head are externally cooled and said body includes metallic wires extending to the combustion chamber wall for the conduction of heat from the body to the wall.

6. An internal combustion engine according to claim 1 wherein said body provides a surface area which is at least twice the cross sectional area of said combustion chamber, the latter area being measured on a plane perpendicular to the direction of movement of said movable wall.

7. An internal combustion engine according to claim 6 wherein the said provided surface area is, at most, 2,000 times the said cross sectional area.

8. An internal combustion engine according to claim 6 wherein the surface area provided by said body is from 10 to 100 times said cross sectional area.

9. An internal combustion engine according to claim 1 wherein the aggregate area of said flame propagation passage is between 0.01 and 0.15 of the cross sectional area of the combustion chamber, measured on a plane perpendicular to the direction of movement of said movable wall.

10. An internal combustion engine according to claim 1 wherein said body provides a surface which is catalytic for the oxidation of at least one member of the class consisting of carbon and nitrogen.

11. An internal combustion engine according to claim 10 wherein said body includes wires having a structural metallic base and a coating of said catalytic material.

12. An internal combustion engine according to claim 11 wherein said coating is the oxide of a metal which was, prior to oxidation, applied to the base metal by electro-plating.

13. An internal combustion engine according to claim 10 wherein said surface is formed of a metal selected from the group consisting of nickel, copper, cobalt, tungsten, silver, iron and alloys of two or more of them.

14. An internal combustion engine according to claim 10 wherein said body includes a metallic base and a coating on said base containing the oxide of a member of the group consisting of nickel, copper, cobalt, tungsten, silver, iron, silicon, aluminum, zirconium and alloys of two or more of them.

* * * * *